(12) United States Patent
Kim et al.

(10) Patent No.: US 11,586,342 B2
(45) Date of Patent: Feb. 21, 2023

(54) METHOD FOR PROVIDING USER INTERFACE AND ELECTRONIC DEVICE THEREFOR

(71) Applicant: Samsung Electronics Co., Ltd., Suwon-si (KR)

(72) Inventors: Jongho Kim, Suwon-si (KR); Minjung Sohn, Suwon-si (KR); Seolhye Won, Suwon-si (KR); Hoon Yoon, Suwon-si (KR); Kangmin Lee, Suwon-si (KR); Sangwoong Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/156,262

(22) Filed: Jan. 22, 2021

(65) Prior Publication Data

US 2021/0223945 A1    Jul. 22, 2021

(30) Foreign Application Priority Data

Jan. 22, 2020  (KR) ........................ 10-2020-0008615

(51) Int. Cl.
*G06F 3/04842* (2022.01)
*H04L 67/306* (2022.01)
(Continued)

(52) U.S. Cl.
CPC ....... *G06F 3/04842* (2013.01); *G06Q 10/101* (2013.01); *H04L 67/306* (2013.01); *H04W 88/02* (2013.01); *H04L 67/535* (2022.05)

(58) Field of Classification Search
CPC .. H04W 76/10; H04W 12/068; H04L 63/0861
See application file for complete search history.

(56) References Cited

U.S. PATENT DOCUMENTS

| 9,081,477 B2 | 7/2015 | Kang |
| 9,326,089 B2 | 4/2016 | Xia et al. |

(Continued)

FOREIGN PATENT DOCUMENTS

| KR | 10-2012-0137552 A | 12/2012 |
| KR | 10-1401728 B1 | 5/2014 |

(Continued)

OTHER PUBLICATIONS

International Search Report of the International Searching Authority in connection with International Application No. PCT/KR2021/000838 dated May 7, 2021, 3 pages.

*Primary Examiner* — Mahran Y Abu Roumi

(57) ABSTRACT

An electronic device is disclosed. The electronic device includes a display, a communication circuit, a memory, and a processor. The processor may be configured to obtain a user input for communication with a first external electronic device and output a first user interface for the communication with the first external electronic device on the display, based on the user input. The processor is also configured to obtain permission information for accessing a second external electronic device associated with an account of the first external electronic device, during the communication with the first external electronic device, and display a second user interface for accessing the second external electronic device on a partial region of the first user interface based on the permission information.

12 Claims, 16 Drawing Sheets

(51) Int. Cl.
*H04W 88/02* (2009.01)
*G06Q 10/10* (2012.01)
*H04L 67/50* (2022.01)
*G06Q 10/101* (2023.01)

(56) References Cited

U.S. PATENT DOCUMENTS

| | | | |
|---|---|---|---|
| 9,798,889 B1* | 10/2017 | Karpel | G06F 40/18 |
| 10,002,607 B2 | 6/2018 | Deora et al. | |
| 10,009,709 B2 | 6/2018 | Putterman et al. | |
| 10,075,530 B2 | 9/2018 | Park et al. | |
| 10,424,290 B2 | 9/2019 | Deora et al. | |
| 10,433,138 B2 | 10/2019 | Putterman et al. | |
| 2011/0296339 A1 | 12/2011 | Kang | |
| 2015/0295966 A1* | 10/2015 | Wong | H04L 65/4069 |
| | | | 709/203 |
| 2015/0373479 A1 | 12/2015 | Xia et al. | |
| 2016/0207400 A1 | 7/2016 | Xia et al. | |
| 2016/0286543 A1 | 9/2016 | Putterman et al. | |
| 2017/0231016 A1* | 8/2017 | Park | H04W 12/068 |
| 2018/0261208 A1 | 9/2018 | Deora et al. | |
| 2018/0288598 A1 | 10/2018 | Putterman et al. | |
| 2019/0230163 A1* | 7/2019 | Chavez | H04L 67/36 |
| 2020/0100081 A1 | 3/2020 | Putterman et al. | |
| 2020/0356221 A1* | 11/2020 | Behzadi | H04M 1/72454 |
| 2021/0076211 A1 | 3/2021 | Lee et al. | |

FOREIGN PATENT DOCUMENTS

| | | |
|---|---|---|
| KR | 10-2018-0104804 A | 9/2018 |
| KR | 10-2019-0088820 A | 7/2019 |

* cited by examiner

METHOD FOR PROVIDING USER INTERFACE AND ELECTRONIC DEVICE THEREFOR

CROSS-REFERENCE TO RELATED APPLICATION

This application is based on and claims priority under 35 U.S.C. § 119(a) to Korean Patent Application No. 10-2020-0008615 filed on Jan. 22, 2020 in the Korean Intellectual Property Office, the disclosure of which is incorporated by reference herein in its entirety.

1. FIELD

The present disclosure relates to a method for providing a user interface and an electronic device therefor.

2. DESCRIPTION OF RELATED ART

A user may communicate with other users by using various electronic devices. For example, a user may communicate with another user having an external electronic device by using an electronic device. The electronic device may communicate with an external electronic device by using a specified application. For example, the electronic device may communicate with an external electronic device by using a messenger application, a call application, and/or an arbitrary application.

With the spread of Internet of things (IoT) devices, the number of devices capable of communicating over the Internet may increase. For example, the IoT device may be any electronic device capable of connection to the Internet. The user may use the electronic device of the user to check the state of the IoT device in a house, even when outside the house. The electronic device may communicate with the IoT device by using an application for accessing the IoT device.

SUMMARY

The user may want to obtain additional information while communicating with another user using the electronic device. For example, the user may want to obtain information related to his or her mother during a call with his or her mother. The user may want to obtain information about the location of a child during a call with the child. The user may want to obtain information about a schedule during a call with a co-worker or another user. For another example, the user may want to take notes on the contents of a call during the call.

In order to obtain other information during a call, the user may perform an input for entering the home screen. The user may enter the home screen from the call application, and then execute the desired application. In this case, the user may have to perform an additional input to execute a separate application. In addition, since the display of the user interface (UI) of the call application is terminated, it may be difficult for the user to obtain information on the call state. In particular, if the user is on a video call, the user may not be able to check the image of the other party.

In accordance with an aspect of the present disclosure, there may be provided an electronic device including a display, a communication circuit, a memory, and a processor operatively connected to the display, the communication circuit, and the memory, in which the processor may be configured to obtain a user input for communication with a first external electronic device, provide a first user interface for the communication with the first external electronic device on the display, based on the user input, obtain permission information for accessing a second external electronic device associated with an account of the first external electronic device, during the communication with the first external electronic device, and display a second user interface for accessing the second external electronic device on a partial region of the first user interface based on the access permission.

In accordance with another aspect of the present disclosure, there may be provided a method for communication with an external electronic device, the method including obtaining an user input for communication with a first external electronic device, providing a first user interface for the communication with the first external electronic device on a display of the electronic device, based on the user input, obtaining permission information for accessing a second external electronic device associated with an account of the first external electronic device, during the communication with the first external electronic device, and displaying a second user interface for accessing the second external electronic device on a partial region of the first user interface based on the access permission.

According to various embodiments of the present disclosure, the electronic device may support effective communication by providing additional information during executing another application.

The electronic device may provide information corresponding to the intention of the user by providing the second UI of the second application based on the setting of the user, information on the other party, and/or execution history.

Besides, various effects may be provided that are directly or indirectly identified through the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With respect to the description of the drawings, the same or similar reference signs may be used for the same or similar elements.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments disclosed in the disclosure will be described with reference to the accompanying drawings. It should be appreciated that embodiments and the terms used therein are not intended to limit the technologies set forth herein to particular embodiments and include various changes, equivalents, and/or replacements for a corresponding embodiment.

Figure 1:
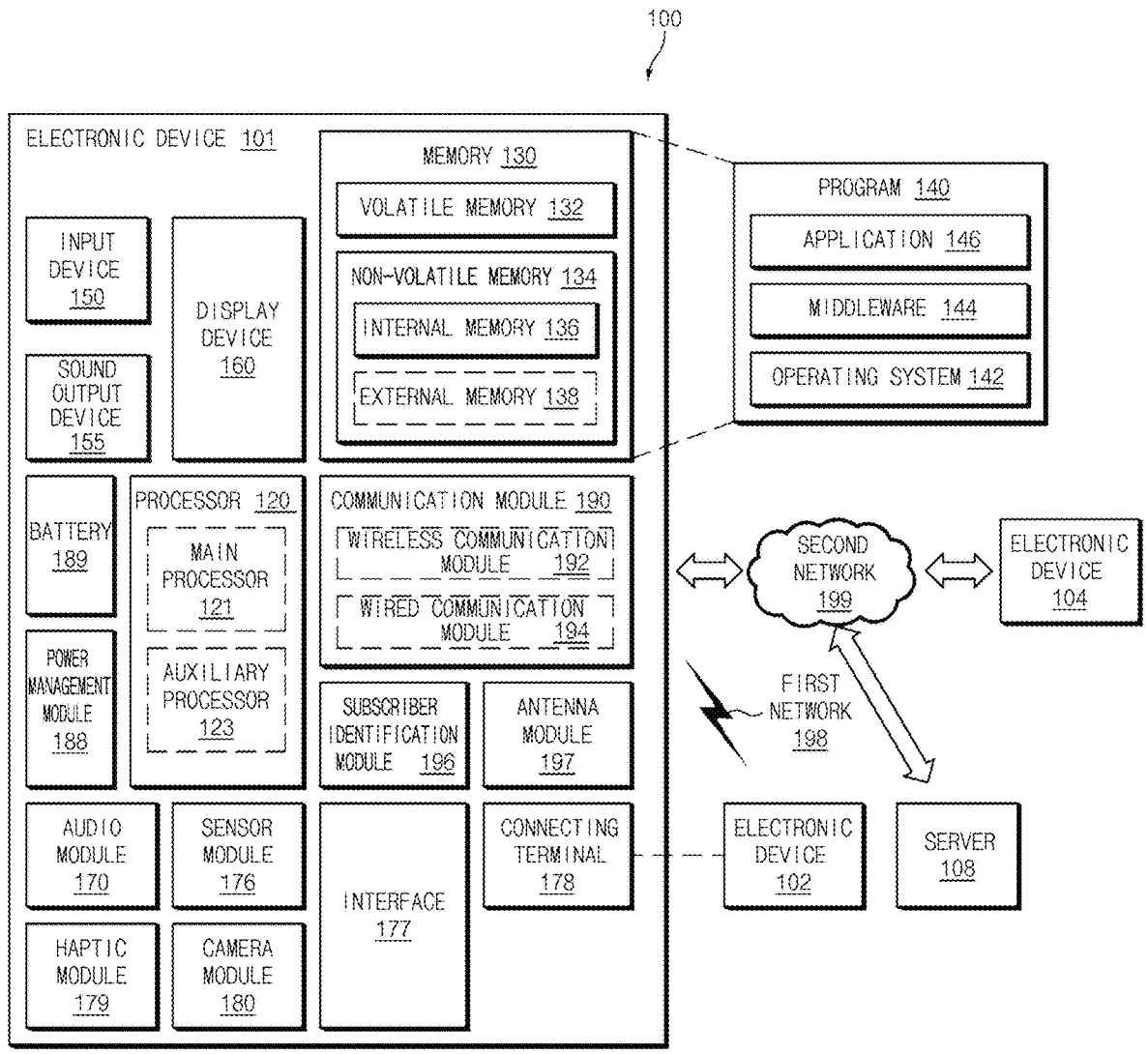
FIG. 1 illustrates a block diagram of an electronic device in a network according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
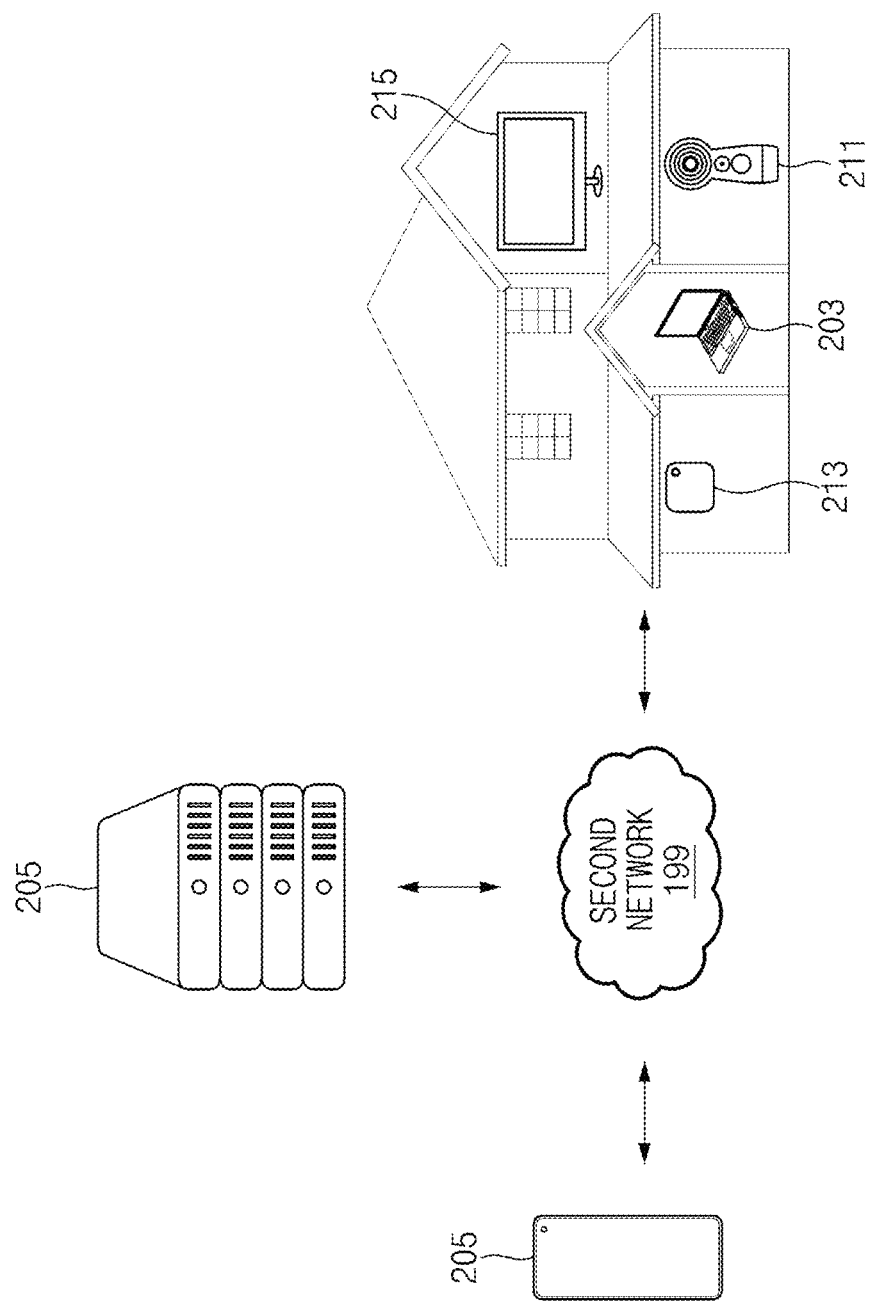
FIG. 2 illustrates a diagram of an example of a communication environment of an electronic device according to an embodiment.

FIG. 2 illustrates a diagram of an example of a communication environment of an electronic device according to an embodiment.

According to an embodiment, an electronic device 201 (e.g., the electronic device 101 of FIG. 1) may communicate with a server 205 (e.g., the server 108 of FIG. 1) via a second network 199. The electronic device 201 may access information related to an account (e.g., a user account) associated with the electronic device 201 stored in a server 205 by logging in to the account. The server 205 may store various information on the user account. The server 205 may include, for example, information on another user account associated with the user account, information on an electronic device associated with the user account, information on another electronic device associated with another user account, and/or access information on another electronic device.

According to an embodiment, the electronic device 201 may communicate with an external electronic device 203 (e.g., the electronic device 104 of FIG. 1) via the second network 199. For example, the electronic device 201 may communicate with the external electronic device 203 by using a call application and/or a messenger application. The user of the electronic device 201 may perform, for example, a voice call or a video call with the user of the external electronic device 203 by using the electronic device 201.

According to an embodiment, the electronic device 201 may communicate with at least one IoT device (e.g., a first IoT device 211, a second IoT device 213, and/or a third IoT device 215) via the second network 199. For example, the IoT device may be an IoT device associated with an account of the external electronic device 203. In this case, the electronic device 201 may communicate with the IoT device based on whether the account of the external electronic device 203 is authorized by a user. The electronic device 201 may access the IoT device if the electronic device 201 is authorized. For example, the electronic device 201 may acquire an image by using the first IoT device 211 (e.g., a video camera). The electronic device 201 may obtain information on the state of the window (open/closed) by using the second IoT device 213 (e.g., a sensor). The electronic device 201 may obtain information on the state (e.g., ON/OFF) of the third IoT device 215 by using the third IoT device 215 (e.g., TV).

The communication environment illustrated in FIG. 2 is exemplary, and embodiments of the present disclosure are not limited thereto. For example, although the electronic device 201 is illustrated as a mobile device in FIG. 2, embodiments of the present document are not limited thereto. The IoT devices illustrated in FIG. 2 are exemplary, and any IoT device capable of accessing the Internet may be used. The external electronic device 203 of FIG. 2 may also be replaced with any electronic device. In FIG. 2, at least one of the components other than the electronic device 201 may be omitted.

According to an embodiment, the electronic device 201 may provide a second user interface based on a second application during communication with the external electronic device 203. The electronic device 201 may use a first application in communication with the external electronic device 203. For example, the first application may be a call application or a messenger application. For another example, the first application may be an application (e.g., an address book application) related to user information of the external electronic device 203. The electronic device 201 may provide the second user interface while the first application is being executed. In this case, the electronic device 201 may display the second user interface on a partial region of the first user interface of the first application.

According to an embodiment, the electronic device 201 may provide a second user interface based on various information. For example, the electronic device 201 may execute the second application based on user setting information and may provide the second user interface with execution of the second application. For another example, the electronic device 201 may select the second application based on a specified condition, and may provide the second user interface with execution of the selected second application. The electronic device 201 may select and execute the second application based on basic settings, contact information, account information, priority, history, external device information, service subscription information, and/or application information. In an example, the electronic device 201 may provide the second user interface without an operation of another user (e.g., without an input of the user) while the first application is being executed.

Hereinafter, the first application and the second application may be statically or dynamically bound or mapped. By providing the second user interface using the second application while the first application is being executed, information that meets the intention of the user more may be provided. In the following various examples, the second user interface may be provided in response to execution of the first application. Execution of the first application may trigger provision of the second user interface. With the execution of the first application, the second user interface may be automatically provided. In the following examples, the second application may be referred to as an application, an applet, a widget, or a plug-in.

Figure 3:
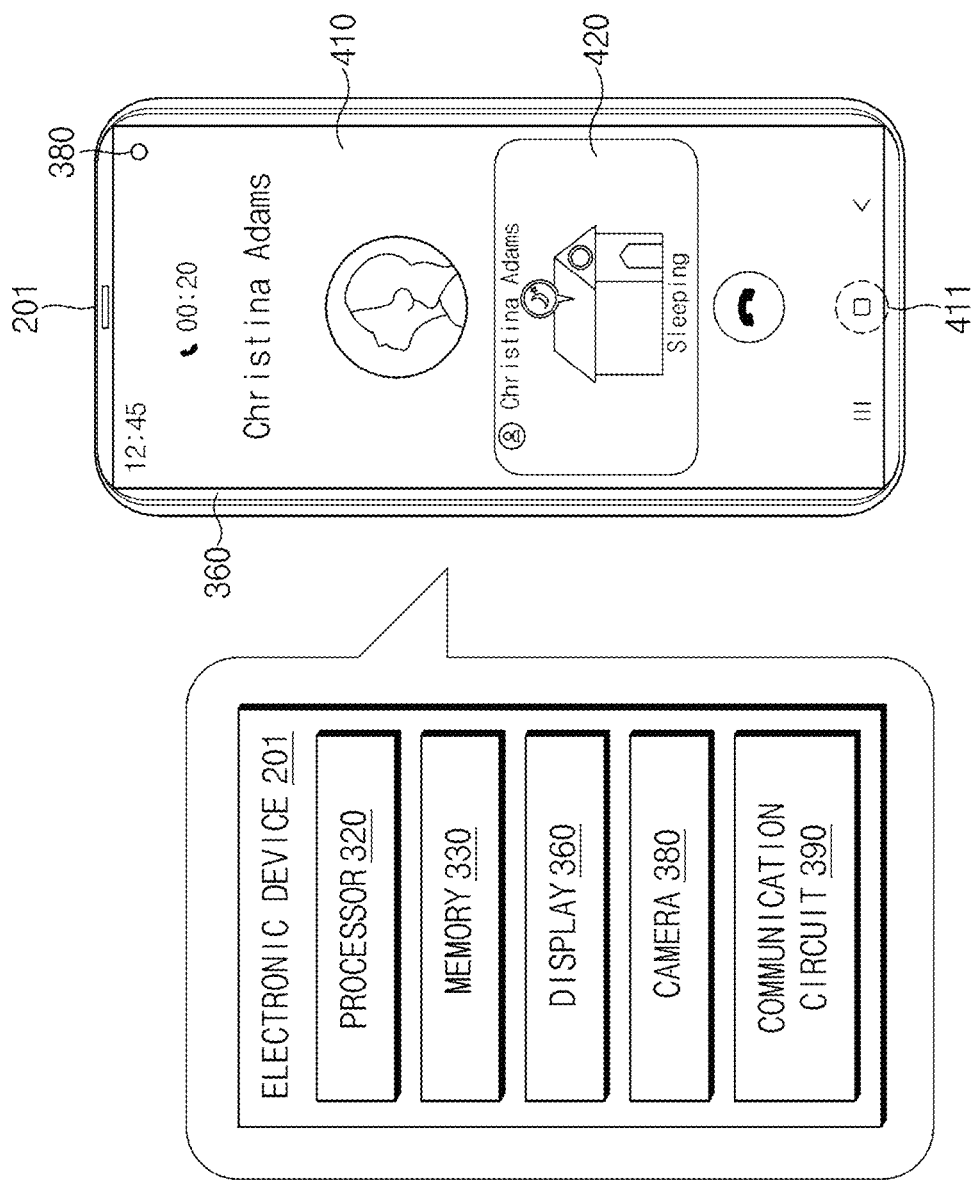
FIG. 3 illustrates a diagram of an example of a configuration of the electronic device according to an embodiment.

FIG. 3 illustrates a diagram of an example of a configuration of the electronic device 201 according to an embodiment.

The electronic device 201 may include a processor 320 (e.g., the processor 120 of FIG. 1 (e.g., an application processor)), a memory 330 (e.g., the memory 130 of FIG. 1), a display 360 (e.g., the display device 160 of FIG. 1), a camera 380 (e.g., the camera module 180 of FIG. 1), and/or a communication circuit 290 (e.g., the communication module 190 of FIG. 1). The configurations of the electronic device 201 illustrated in FIG. 3 are exemplary, and embodiments of the present disclosure are not limited thereto. For example, the electronic device 201 may not include at least one of the components illustrated in FIG. 3. For another example, the electronic device 201 may further include a component not illustrated in FIG. 3.

According to an embodiment, the processor 320 may be operatively connected to the memory 330, the display 360, the camera 380, and/or the communication circuit 390. The processor 320 may control components of the electronic device 201. For example, the processor 320 may control the components of the electronic device 201 according to one or more instructions stored in the memory 330. For example, the memory 330 may store at least one application (e.g., a first application and/or a second application). According to an embodiment, the processor 320 may include an application processor and/or a communication processor.

According to an embodiment, the display 360 may display an image and receive a touch input. For example, the display 360 may include a plurality of pixels that emit light. The processor 320 may display an image by using at least some pixels of the display 360. The display 360 may include a touch sensing layer for sensing a touch input. The display 360 may transfer information on the acquired touch input to the processor 320.

According to an embodiment, the camera 380 may acquire an image. For example, the camera 380 may include an image sensor for acquiring an image. The processor 320 may acquire an image of an external object by using the camera 380. For example, the processor 320 may acquire a still image and/or a moving picture by using the camera 380. In an example, the electronic device 201 may include a plurality of cameras.

According to an embodiment, the communication circuit 390 may provide the electronic device 201 with communication with the external electronic device via at least one network. For example, the communication circuit 390 may support transmission and reception of signals for a short-range wireless network (e.g., WiFi, Bluetooth, near field communication (NFC), and/or a neighbor awareness communication (NAN)) and/or a long-range wireless network (e.g., a cellular network).

Figure 4:
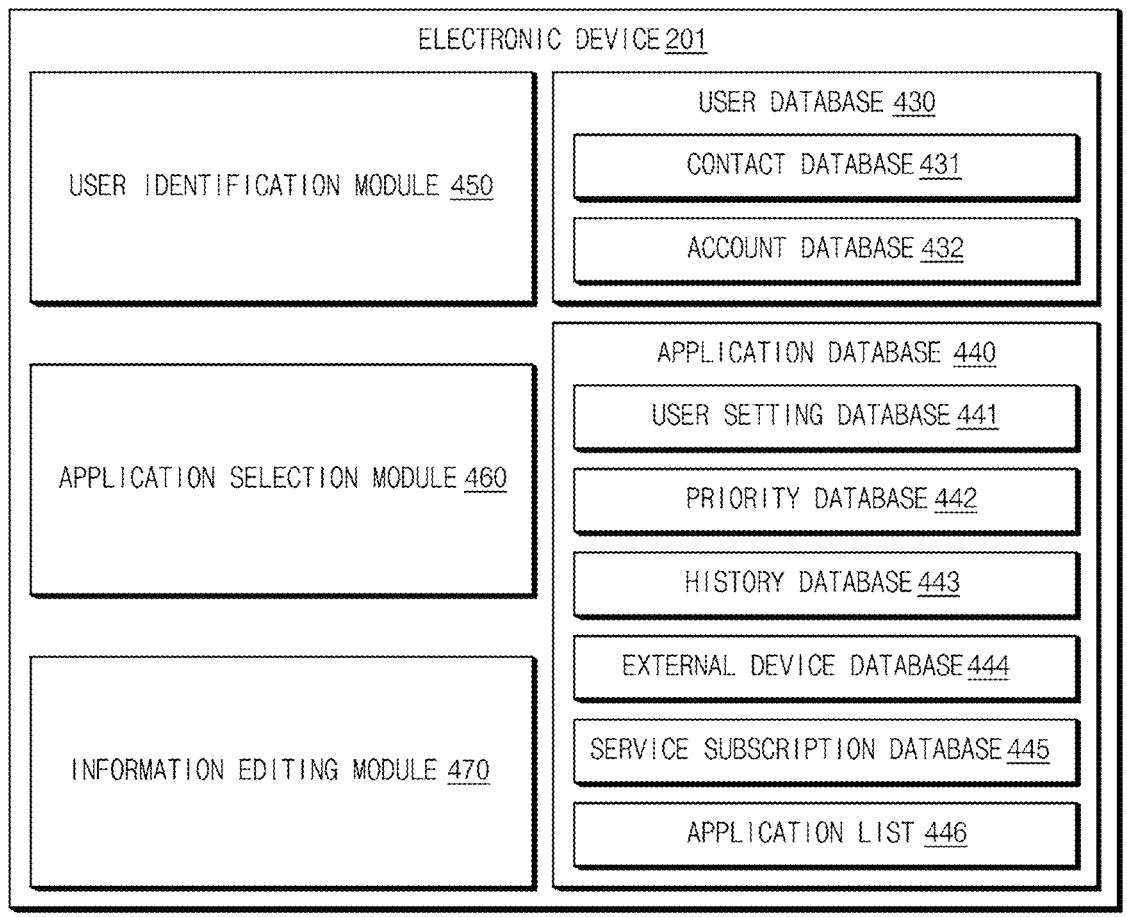
FIG. 4 illustrates a block diagram of the electronic device according to an embodiment.

According to an embodiment, the electronic device 201 may provide a first user interface 410 with execution of the first application on the display 360. For example, the first application may be an application for communication with the external electronic device 203. In FIG. 4, the first user interface 410 may correspond to an execution screen of the call application.

According to an embodiment, the electronic device 201 may provide a second user interface 420 on the first user interface 410. For example, the second user interface 420 may correspond to an execution screen of the second application. The electronic device 201 may identify a second application associated with the first application when it is executed and may provide the second user interface 420 on the first user interface 410. The second user interface 420 may include, for example, information on the other party of the external electronic device 203 communicating with the electronic device 201.

In the examples of the present disclosure, the user of the electronic device 201 may check the second user interface 420 without performing an input to a home button 411 on the first user interface 410. Hereinafter, methods for selecting the second application and providing the second user interface 420 at the electronic device 201 may be described with reference to FIG. 4.

According to an embodiment, the electronic device 201 may include the display 360, the communication circuit 390, the memory 330, and the processor 320. The processor 320 may be operatively connected to the display 360, the communication circuit 390, and the memory 330. The processor 320 may be configured to obtain a user input for communication with a first external electronic device, provide a first user interface for the communication with the first external electronic device on the display, based on the user input, obtain permission information for accessing a second external electronic device associated with an account of the first external electronic device, during the communication with the first external electronic device, and display a second user interface for accessing the second external electronic device on a partial region of the first user interface based on the access permission.

For example, the processor 320 may be configured to obtain the permission information from the memory, or obtain the permission information from a server for storing account information of the electronic device and account information of the first external electronic device.

For example, the processor 320 may be configured to obtain information on access permission by transmitting, to the first external electronic device, information requesting permission for access to the second external electronic device, and receiving a response corresponding to the requesting.

For example, the processor 320 may be configured to determine the second application based on user identification information of the first external electronic device, and to provide the second user interface by using the second application.

For example, the processor 320 may be configured to determine an application set for the user identification information as the second application.

For example, the processor 320 may be configured to obtain information from the second external electronic device by using the second application and to generate the second user interface by using the obtained information.

For example, the second user interface may correspond to a widget provided by the second application. For example, the second external electronic device may be an internet-of-things (IoT) device owned by a user of the first external electronic device.

For example, the processor 320 may be configured to determine a plurality of second applications based on user identification information of the first external electronic device, and to provide the second user interface by using the plurality of second applications.

The processor 320 may be further configured to generate the second user interface based on the number of the plurality of second user interfaces.

FIG. 4 illustrates a block diagram of the electronic device according to an embodiment.

The components of FIG. 4 may correspond to a software module and/or a database of the electronic device 201. For example, the components of FIG. 4 may be components in which instructions stored in the memory 330 of the electronic device 201 are implemented by execution of the processor 320. The operations of the components of FIG. 4 may be referred to as operations performed by the processor 320 of the electronic device 201.

According to an embodiment, a user identification module 450 may obtain information on the other party (e.g., the user of the external electronic device 203) and may transfer user information on the other party to an application selection module 460. For example, when the first application is executed, the user identification module 450 may transfer information on the other party to the application selection module 460. For example, the user identification module 450 may transfer account information on the other party, information on the other party (e.g., relationship with the user, address, group, and/or birthday) and/or contact information (e.g., phone number and/or email) to the application selection module 460. The user identification module 450 may obtain information on the other party from the user database 430 of the electronic device 201.

The user database 430 may include a contact database 431 including contact information for at least one user. For example, the contact database 431 may store a relationship with the user, address, group, birthday, phone number, and/or email information. In an example, the contact database 431 may further include contact information collected from an external electronic device in addition to contact information input by the user of the electronic device 201. For example, the contact information may include contact information of a financial institution, a public institution, and/or a business. The user database 430 may include an account database 432. For example, the account database 432 may include account information for at least one user. For example, the account information may include account information associated with the external electronic device 203 in the server 205. The account database 432 may include account information and permission information set by the account. For example, the permission information may include information on the access permission to an electronic device (e.g., the IoT device of FIG. 2) associated with the account.

According to an embodiment, the user identification module 450 may obtain user information from the memory 330 and/or the server 205 of the electronic device 201. For example, the user identification module 450 may receive a user information from the user database 430 and/or the server 205. The user identification module 450 may obtain, from the server 205, at least some of the information described above with reference to the user database 430.

According to an embodiment, the application selection module 460 may select at least one second application based on the application database 440. For example, if user information is received from the user identification module 450, the application selection module 460 may select at least one second application for providing the second user interface 420 by using the user information and the application database 440. The application selection module 460 may select at least one second application to be used for the corresponding user by using the user information on the other party. A method for selecting at least one second application by the application selection module 460 may be referred to by a method described later with reference to FIG. 5.

The application database 440 may include a user setting database 441, a priority database 442, a history database 443, an external device database 444, a service subscription database 445, and/or an application list 446.

The user setting database 441 may include application mapping information set by the user of the electronic device 201. For example, the user of the electronic device 201 may set the second application for a specific user. If the first application is executed for the corresponding user, the electronic device 201 may execute the second application mapped based on the mapping information of the user setting database 441.

The history database 443 may include information on the frequency of applications recorded during communication (e.g., information on recently executed applications, information on the number of application executions, and/or information on an application running time). For example, the information on the recently executed applications may include information on an application used together during communication (e.g., execution of a first application) with the other party (e.g., a call partner). The information on the number of application executions may include information on the number of executions of an application executed during communication with the other party. The information on the application running time may include information on an accumulated time when a corresponding application is executed during communication with the other party.

The external device database 444 may include information on an electronic device (e.g., an IoT device) associated with the external electronic device 203. For example, referring to FIG. 2, information on the external electronic device may include an IoT device (e.g., the first IoT device 211, the second IoT device 213, and/or the third IoT device 215) associated with the user account of the external electronic device 203. The information of the IoT device may include identification information and/or permission information of the IoT device. For example, the permission information may include information on the access permission of the electronic device 201 to the corresponding IoT device. The access permission may be set based on whether or not the owner of the IoT device (e.g., the user of the external electronic device 203) approves. The external device database 444 may further include information on the access frequency of the IoT device.

The service subscription database 445 may include service subscription information associated with the user account of the electronic device 201 and/or the external electronic device 203. For example, the service subscription information may include subscription information for a content provider service. The service subscription information may include information on whether to install a plug-in for a specific service.

The application list 446 may include information on applications installed in the electronic device 201. For example, the application list 446 may include a list of applications that may be provided through the second user interface 420 among applications installed in the electronic device 201.

The priority database 442 may include priority and/or weight information for the selection of the second application. For example, the priority database 442 may include information on weight values set for information in the application database 440. For example, the priority database 442 may include information on priorities between applications.

According to an embodiment, the information editing module 470 may generate the second user interface by using at least one second application selected by the application selection module 460. The information editing module 470 may collect at least information associated with the second application and edit the collected information to generate the second user interface. For example, the electronic device 201 may provide the second user interface generated by the information editing module 470 on at least a partial region of the first user interface. The information editing module 470 may generate the second user interface to be described later with reference to FIGS. 6 to 10.

Figure 5:
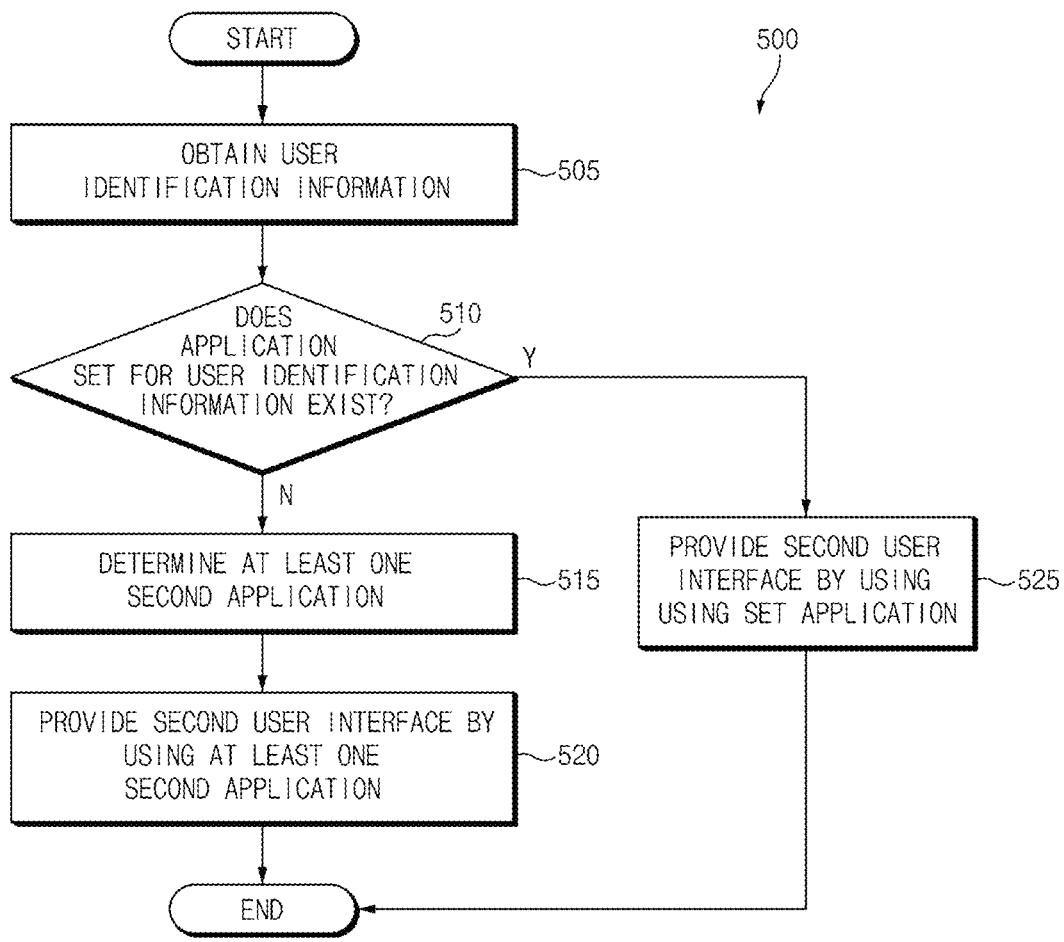
FIG. 5 illustrates an example flowchart of a method for providing a second user interface according to an embodiment.

FIG. 5 illustrates an example flowchart 500 of a method for providing a second user interface according to an embodiment.

According to an embodiment, in operation 505, the electronic device 201 may obtain user identification information. For example, the electronic device 201 may obtain user identification information for the user of the external electronic device 203 while the first application is being executed. The electronic device 201 may obtain the user identification information by using the user identification module 450 of FIG. 4. The electronic device 201 may obtain the user identification information from a database of the electronic device 201 (e.g., the user database 430 of FIG. 4) and/or a database of the server 205.

In operation 510, the electronic device 201 may determine whether or not an application set (e.g., mapped) for user identification information exists. For example, the electronic device 201 may determine whether or not at least one second application set for the corresponding user (e.g., user identification information) exists by using the user setting database 441 of the electronic device 201.

If the set application exists (e.g., Yes in operation 510), the electronic device 201 may provide the second user interface by using the set application in operation 525. For example, the electronic device 201 may provide a second user interface 1020, which will be described later with reference to FIG. 10.

For example, the user of the electronic device 201 may execute the first application to communicate with parents. The user of the electronic device 201 may want to execute an application for accessing an IoT device (e.g., a camera) in order to check the state of the parents during communication with the parents. The user may set the application for accessing the IoT device as the second application.

For example, the user of the electronic device 201 may execute the first application to communicate with a child. The user of the electronic device 201 may want to execute an application for checking the location of the child during communication with the child. The user may set the application for checking the location of the child (e.g., a tracker plug-in) as the second application.

For example, the user of the electronic device 201 may execute the first application to communicate with a workmate. The user of the electronic device 201 may want to execute an application for checking a schedule during communication with the workmate. For example, the user may set an application that provides information on the schedule (e.g., a calendar widget) as the second application.

If the set application does not exist (e.g., No in operation 510), the electronic device 201 may determine at least one second application in operation 515. For example, the electronic device 201 may determine at least one second application by using the application selection module 460 of FIG. 4.

For example, the electronic device 201 may determine at least one second application based on a history database (e.g., the history database 443 of FIG. 4). The electronic device 201 may determine the most recently used application, the most frequently used application, and/or the longest used application as the second application(s) during communication with the corresponding user.

For example, the electronic device 201 may determine at least one second application based on an external device database (e.g., the external device database 444 of FIG. 4). For example, if at least one external device (e.g., IoT device) associated with the user of the external electronic device 203 exists, the electronic device 201 may determine an application for access to the at least one external device as the second application.

For example, the electronic device 201 may determine at least one second application based on a service subscription database (e.g., the service subscription database 445 of FIG. 4). For example, if the user of the external electronic device 203 is subscribed to a specified service, the electronic device 201 may determine an application for accessing the specified service as the second application.

For example, the electronic device 201 may determine at least one second application based on a combination of the history database 443, the external device database 444, and/or the service subscription database 445. In this case, the electronic device 201 may determine at least one second application by using the priority database 442.

In an example, the priority database 442 may include priority information. The priority set for the external device database 444 may be higher than the priority of the history database 443. If external device information and history information associated with the user of the external electronic device 203 exist, the electronic device 201 may determine at least one second application based on the external device information having a high priority.

In an example, the priority database 442 may include weight information. The electronic device 201 may determine at least one second application by using a weight for each piece of information. For example, the electronic device 201 may add weight values for respective pieces of information and determine at least one second application based on the sum of weight values for respective applications. For example, the electronic device 201 may determine an application corresponding to a specified sum of weights or more as the second application. For another example, the electronic device 201 may determine N applications having the highest weight sum (e.g., N is an integer greater than or equal to 1) as the second application. Table 1 shows a weight setting value according to an example.

TABLE 1

| Information type | Related applications | Determination condition | Weight |
| --- | --- | --- | --- |
| Service subscription information | Subscribed service providing application | When subscribed | 3 |
| External device information | External device connection application | When there is a shared external device | 2 |
| History information and application information | Specified application | When installed Executed L or more times | 0.5 0.5 |
| | | M hours or more of running time | 0.5 |
| Memo application | | When installed: Condition 1) When executed L or more times Condition 2) When running time is M hours or more | 0.4 + a number of satisfied condition*0.5 |
| Recording application | | | 0.3 + a number of satisfied condition*0.5 |
| Calendar application | | | 0.2 + a number of satisfied condition*0.5 |
| Mail application | | | 0.1 + a number of satisfied condition*0.5 |

For example, the electronic device 201 and the external electronic device 203 may be communicating, and a user of the external electronic device 203 may have subscribed to a specified service. In this case, a weight of 3 may be applied to the application providing the corresponding service. For example, if a specified application is installed in the electronic device 201, is executed L (L is an integer of 1 or more) or more times, and the running time thereof is M (M is an integer of 1 or more) hours or more, a weight of 1.5 may be applied to the specified application. For example, if the memo application of the electronic device 201 is executed L or more times and the running time thereof is M hours or more, the weight for the memo application may be set to 1.4. In this case, the electronic device 201 may determine an application providing a service having the highest weight as the second application.

In operation 520, the electronic device 201 may provide a second user interface by using at least one second application. Hereinafter, examples of providing a second user interface may be described with reference to FIGS. 6 to 10.

Figure 6:
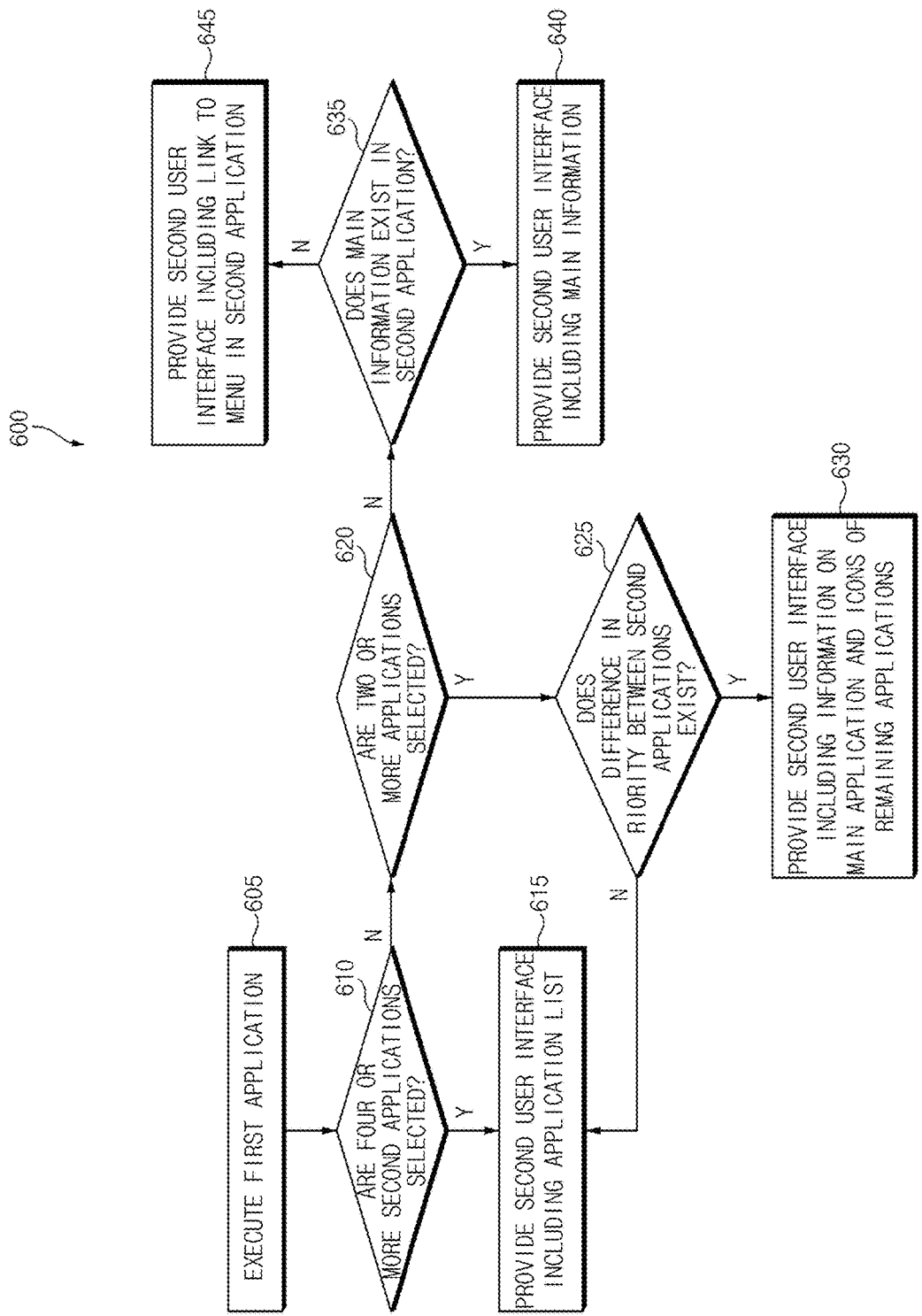
FIG. 6 illustrates an example flowchart of a method for providing a second user interface according to an embodiment.

FIG. 6 illustrates an example flowchart of a method for providing a second user interface according to an embodiment.

In operation 605, the electronic device 201 may execute a first application. For example, the electronic device 201 may execute a first application for communication with the external electronic device 203 based on a user input. The electronic device 201 may provide a first user interface based on the first application. In response to the execution of the first application, the electronic device 201 may determine at least one second application. For example, the electronic device 201 may identify or determine at least one second application based on operations 510 and 515 of FIG. 5.

In operation 610, the electronic device 201 may determine whether four or more second applications are selected. For example, if four or more second applications are selected (e.g., Yes in operation 610), the electronic device 201 may provide the second user interface including an application list in operation 615. An example of the second user interface may be referred to by FIG. 7.

Figure 7:
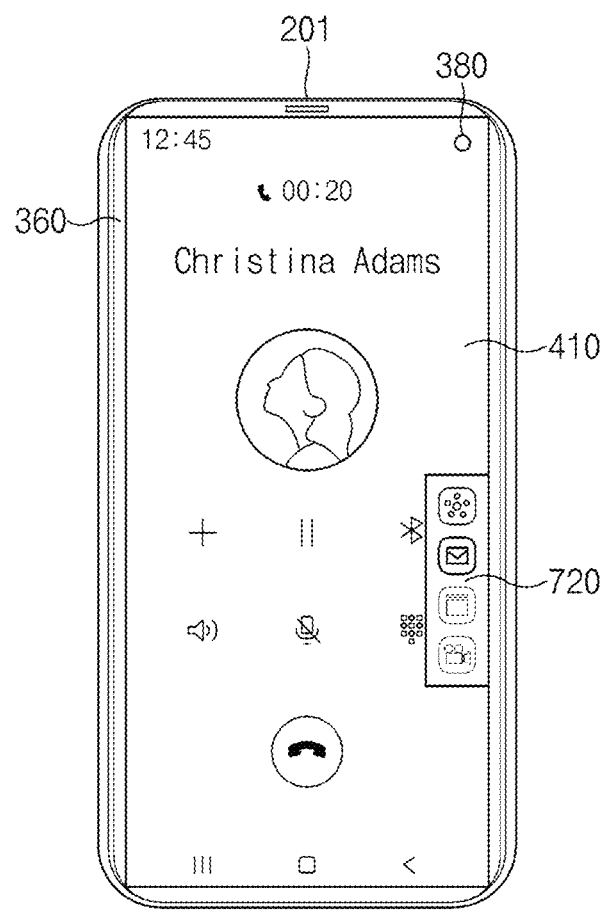
FIG. 7 illustrates a diagram of an example of a second user interface including a plurality of application icons according to an embodiment.

FIG. 7 illustrates a diagram of an example of a second user interface 720 including a plurality of application icons according to an embodiment. If four or more second applications are set, the electronic device 201 may provide a second user interface 720 including a list of second applications on at least a partial region of the first user interface 410. For example, the second user interface 720 may include icons of the selected second applications. If an input for one of the icons of the second user interface 720 is received, the electronic device 201 may provide a user interface corresponding to a second user interface 920 of FIG. 9 or a second user interface 1020 of FIG. 10 by using the corresponding application.

Referring back to FIG. 6, if less than four second applications are selected (e.g., No in operation 610), the electronic device 201 may determine whether or not two or more second applications are selected in operation 620. If two or more applications are selected (e.g., Yes in operation 620), the electronic device 201 may determine whether a difference in priority between the second applications exists in operation 625. For example, if there is no difference in priority (e.g., No in operation 625), the electronic device 201 may provide the second user interface according to operation 615. If there is a difference in priority (e.g., Yes in operation 625), the electronic device 201 may provide the second user interface including information on the main application (e.g., the second application having a high priority) and icons of remaining applications among the second applications. An example of the second user interface may be referred to by FIG. 8.

Figure 8:
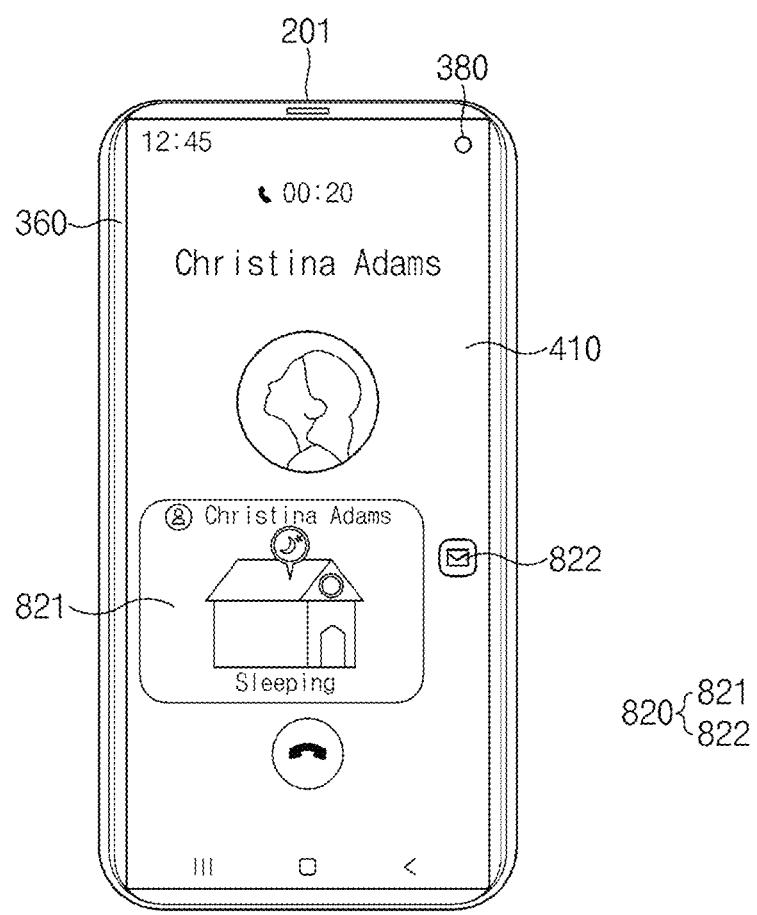
FIG. 8 illustrates a diagram of an example of a second user interface including an icon and main information.

FIG. 8 illustrates a diagram of an example of a second user interface 820 including an icon 822 and main information 821. If two or three second applications are set, the electronic device 201 may provide the main information 821 for a second application having a high priority, and only the icon 822 for the remaining second application having a low priority. For example, the main information 821 may include information obtained from the second application having a high priority and/or information generated based on the obtained information. In the example of FIG. 8, the main information 821 may include state information (e.g., sleeping) of the user (e.g., Christina Adams) of the external electronic device 203. The main information 821 may include state information generated based on information obtained from an IoT device associated with the external electronic device 203.

Referring back to FIG. 6, if one application is selected (e.g., Yes in operation 620), the electronic device 201 may determine whether or not main information exists in the second application in operation 635. For example, if the second application provides main information, the electronic device 201 may determine that the main information exists. If the second application is capable of providing abbreviated information such as a widget, the electronic device 201 may determine that the second application is capable of providing the main information.

If the main information does not exist (e.g., No in operation 635), the electronic device 201 may provide a second user interface including a link to a menu in the second application in operation 645. For example, the second user interface may be an execution screen of the second application provided in the form of a PIP on the first user interface. For another example, the second user interface may be a user interface including a button (e.g., a link) on an execution screen of the second application. An example of the second user interface may be referred to by FIG. 9.

Figure 9:
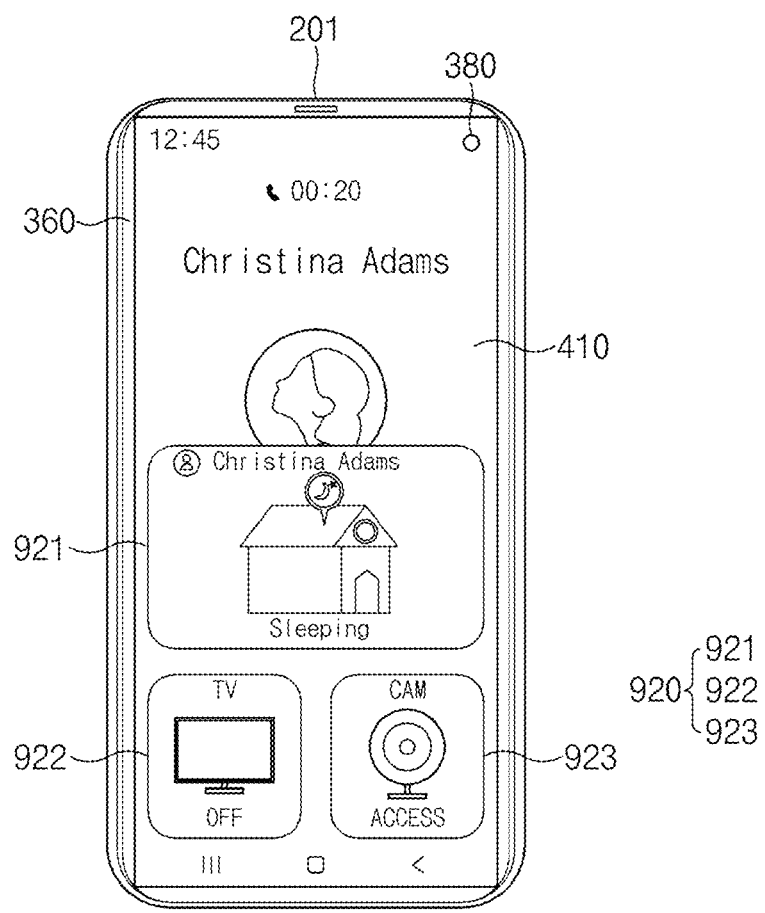
FIG. 9 illustrates a diagram of an example of a second user interface.

FIG. 9 illustrates a diagram of an example of a second user interface 920. For example, the second user interface 920 may include summary information 921, state information 922, and an access interface 923 included in the execution screen of the second application. For example, the second user interface 920 may be reconstructed from the execution screen of the second application. For example, the summary information 921 may include information similar to the main information 821 of FIG. 8. In the example of FIG. 9, it may be assumed that the second application does not provide a widget corresponding to the main information. The state information 922 may indicate the state (e.g., ON/OFF) of the third IoT device 215 of the other party (Christina Adams). The access interface 923 may provide an interface for accessing the first IoT device 211. If an input for the access interface 923 is received, the electronic device 201 may acquire an image by using the first IoT device 211.

If main information exists (e.g., Yes in operation 635), the electronic device 201 may provide a second user interface including mail information in operation 640. An example of the second user interface may be referred to by FIG. 10.

Figure 10:
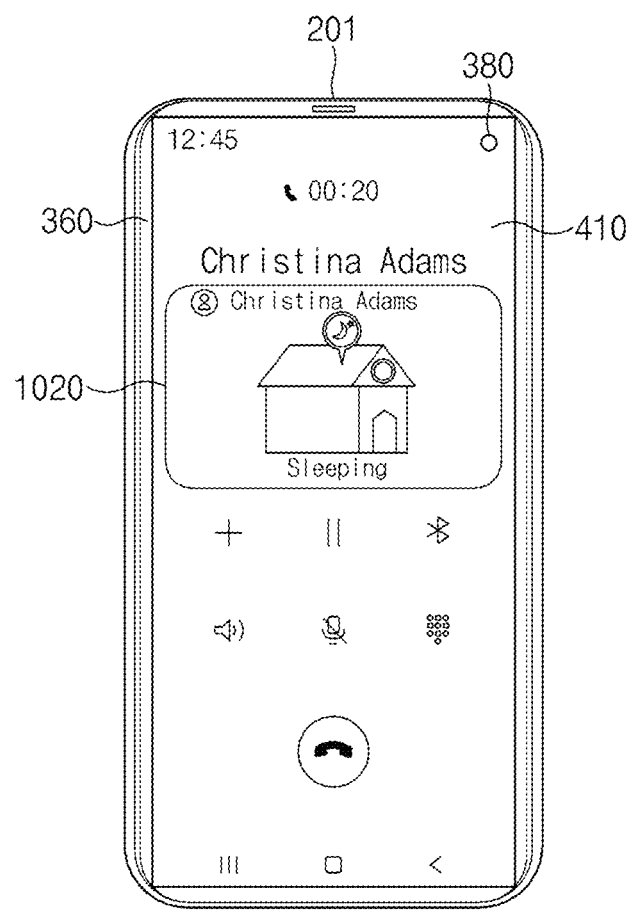
FIG. 10 illustrates a diagram of an example of a second user interface including main information.

FIG. 10 illustrates a diagram of an example of a second user interface 1020 including main information. For example, the second user interface 1020 may include information similar to the main information 821 of FIG. 8.

Figure 11:
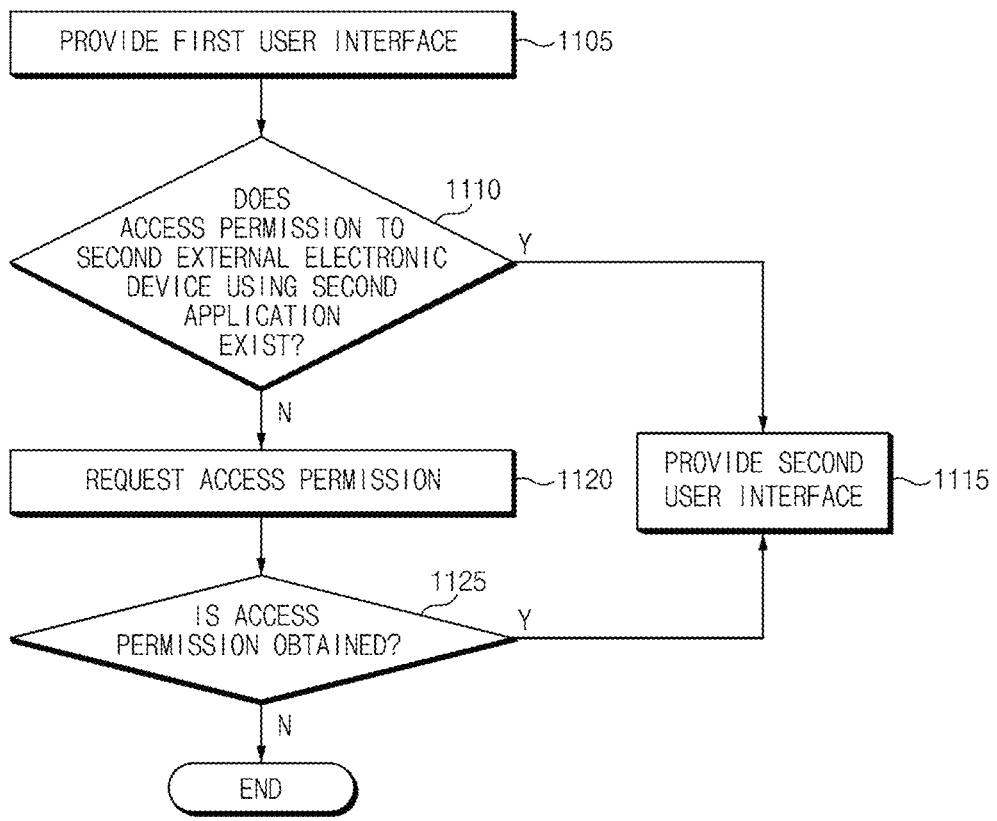
FIG. 11 illustrates a diagram of an example of a method for providing a second user interface based on access permission according to an embodiment.

FIG. 11 illustrates a diagram of an example of a method for providing a second user interface based on access permission according to an embodiment.

According to an embodiment, the electronic device 201 may provide the second user interface based on access permission to an IoT device of the user of the external electronic device 203 (e.g., the first IoT device 211, the second IoT device 213, and/or the third IoT device 215). For example, access to the IoT of another user may lead to an invasion of privacy of the other user. The electronic device 201 may prevent the invasion of privacy by providing the second user interface based on access permission.

In operation 1105, the electronic device 201 may provide a first user interface. For example, the electronic device 201 may provide the first user interface in response to executing the first application.

In operation 1110, the electronic device 201 may determine whether or not access permission to a second external electronic device (e.g., the first IoT device 211, the second IoT device 213, or the third IoT device 215) using the second application exists. For example, the electronic device 201 may determine whether or not access permission to the corresponding second external electronic device exists from the memory (e.g., the external device database 444 of FIG. 4) of the electronic device 201. If consent for access to the second external electronic device is obtained from the external electronic device 203, or if consent for access to the second external electronic device is obtained from the server 205, the electronic device 201 may store information indicating that the access permission to the corresponding second external electronic device exists in the memory of the electronic device 201. For another example, the electronic device 201 may obtain access permission to the second external electronic device from the server 205.

If access permission to the second external electronic device exists (e.g., Yes in operation 1110), the electronic device 201 may provide a second user interface providing access to the second external electronic device in operation 1115.

If the access permission to the second external electronic device does not exist (e.g., No in operation 1110), the electronic device 201 may request that the external electronic device 203 gives access permission in operation 1120. For example, the electronic device 201 may request that the external electronic device 203 or the server 205 gives access permission to the second external electronic device.

In operation 1125, the electronic device 201 may determine whether or not access permission has been obtained in response to the request for access permission. For example, if information indicating permission to access is received from the external electronic device 203 or the server 205, the electronic device 201 may determine that the access permission has been obtained. In this case, the electronic device 201 may provide the second user interface. For example, if information indicating non-permission to access is received or if permission to access is not received within a specified time, the electronic device 201 may determine that the access permission has not been obtained. In this case, the electronic device 201 may not provide the second user interface.

Figure 12:
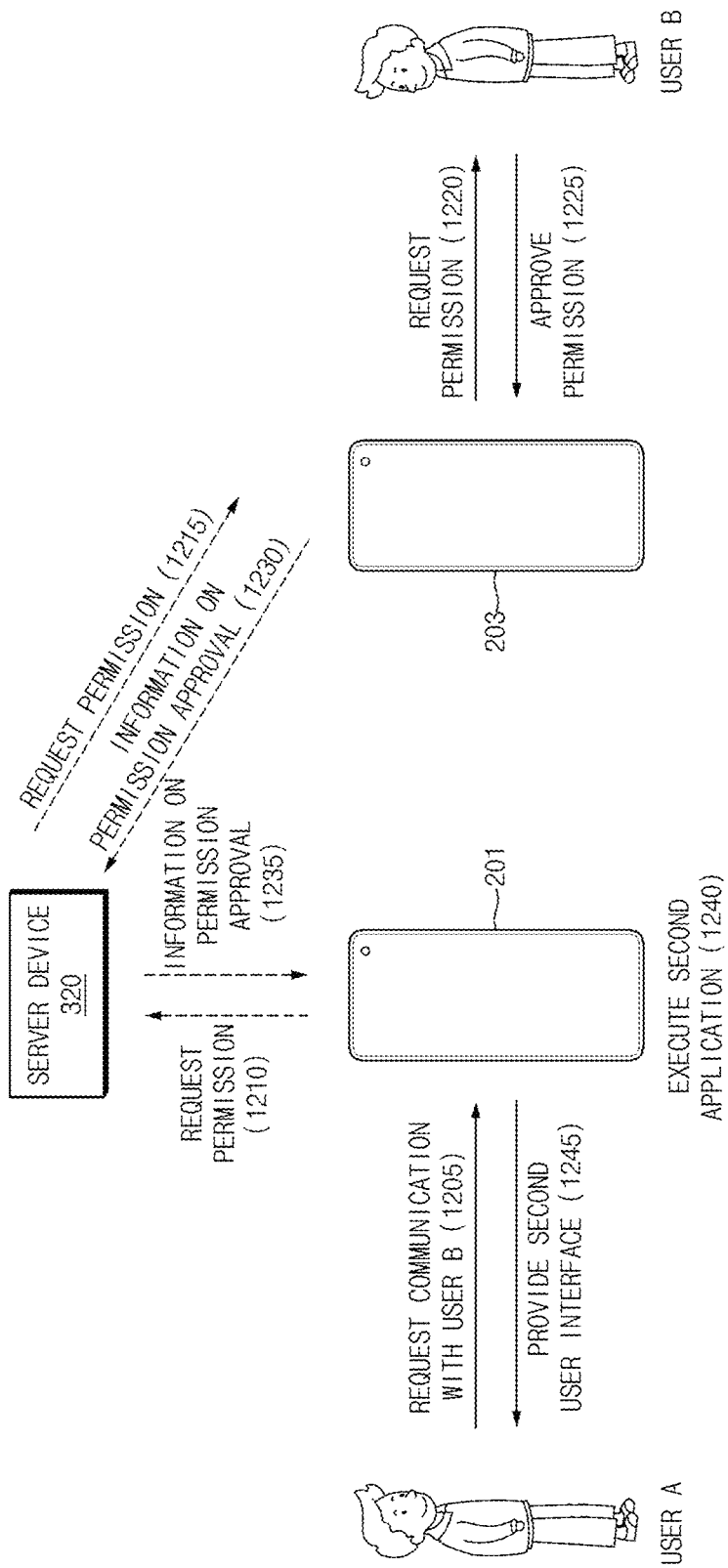
FIG. 12 illustrates a diagram of an example of a method for providing a second user interface according to an embodiment.

FIG. 12 illustrates a diagram of an example of a method for providing a second user interface according to an embodiment.

In FIG. 12, it may be assumed that a user A is a user of the electronic device 201 and a user B is a user of the external electronic device 203.

In operation 1205, the user A may request communication with the user B. For example, the user A may request communication with the user B by using the first application for communication (e.g., a call application or a messenger application) using the electronic device 201. For example, in response to a request for communication with the user B, the electronic device 201 may request the server 205 to permit access to the second external electronic device associated with the external electronic device 203, in operation 1210. The electronic device 201 or the server 205 may not have the access permission to the second external electronic device. In order to protect personal information, the electronic device 201 may be configured to request the access permission to the second external electronic device every time.

In operation 1215, the server 205 may transmit, to the external electronic device 203, the permission to access to the second external electronic device. If the permission request is received, the external electronic device 203 may request that the user B gives permission, in operation 1220. For example, the external electronic device 203 may provide a "message for querying the user A whether to permit access to the second external electronic device".

In operation 1125, the external electronic device 203 may receive permission approval from the user B. In operation 1230, the external electronic device 203 may transmit information indicating the permission approval to the server 205. In operation 1235, the server 205 may transmit information on permission approval to the electronic device 201. In operation 1240, in response to receiving the information on permission approval, the electronic device 201 may execute the second application. In operation 1245, the electronic device 201 may provide the second user interface with the execution of the second application.

Figure 13:
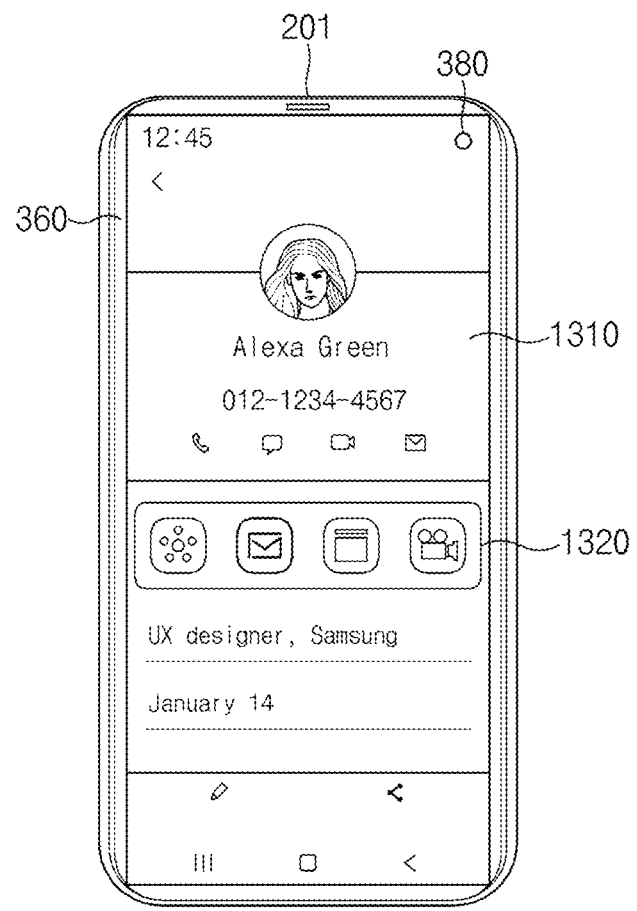
FIG. 13 illustrates a diagram of an example of g a second user interface on an address book according to an embodiment.

FIG. 13 illustrates a diagram of an example of a second user interface on an address book according to an embodiment.

In the above-described examples, the first application has been described as an application for communication between the electronic device 201 and the external electronic device 203; however, embodiments of the present disclosure are not limited thereto. The first application may be any application that provides user information on the external electronic device 203. For example, the first application may be an address book application.

If a specific user of the address book (e.g., Alexa Green) is selected, the electronic device 201 may provide a first user interface 1310 including information of the corresponding user. The electronic device 201 may provide a first user interface 1310 and a second user interface 1320 together. For example, the second user interface 1320 may include information on at least one second application set or determined for a corresponding user. In the example of FIG. 13, if an input for the call button of the first user interface 1310 is received, the electronic device 201 may execute the second application presented by the second user interface 1320 together with the call application. For example, the electronic device 201 may provide the user interface of the call application and the user interface of the second application together.

Figure 14:
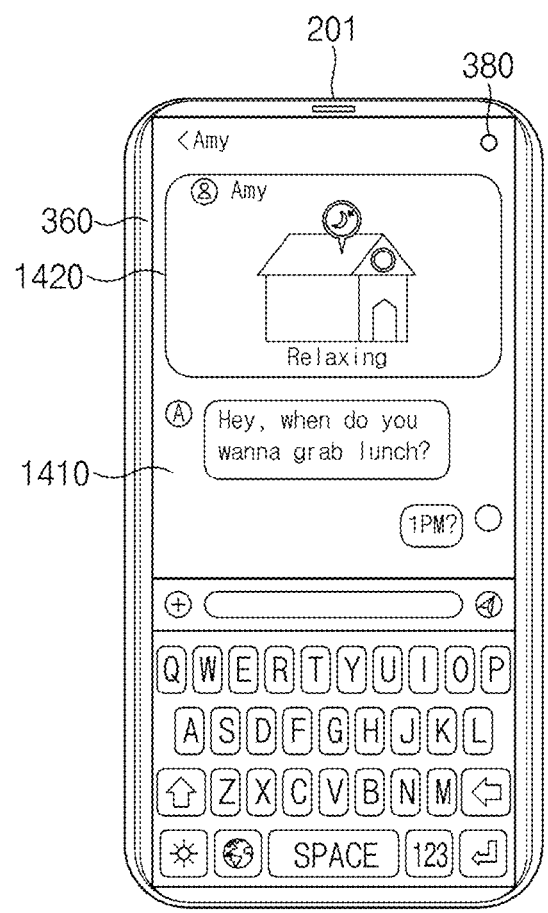
FIG. 14 illustrates a diagram of an example of a second user interface on a messenger application according to an embodiment.

FIG. 14 illustrates a diagram of an example of a second user interface on a messenger application according to an embodiment.

In the example of FIG. 14, the first application may be a messenger application. For example, a first user interface 1410 may correspond to an execution screen of the messenger application. The first user interface 1410 may be a user interface corresponding to a thread of conversation with a specific user (e.g., Amy) of the messenger application. A second user interface 1420 (e.g., the second user interface 1020 of FIG. 10) may be generated based on information obtained from the second application. According to an embodiment, the electronic device 201 may determine the second application based on the conversation content of the messenger application. For example, the electronic device 201 may perform text recognition on the conversation content and may determine the second application based on the text recognition. For example, if the conversation content corresponds to watching a movie, the electronic device 201 may determine an application related to a movie reservation as the second application.

Figure 15:
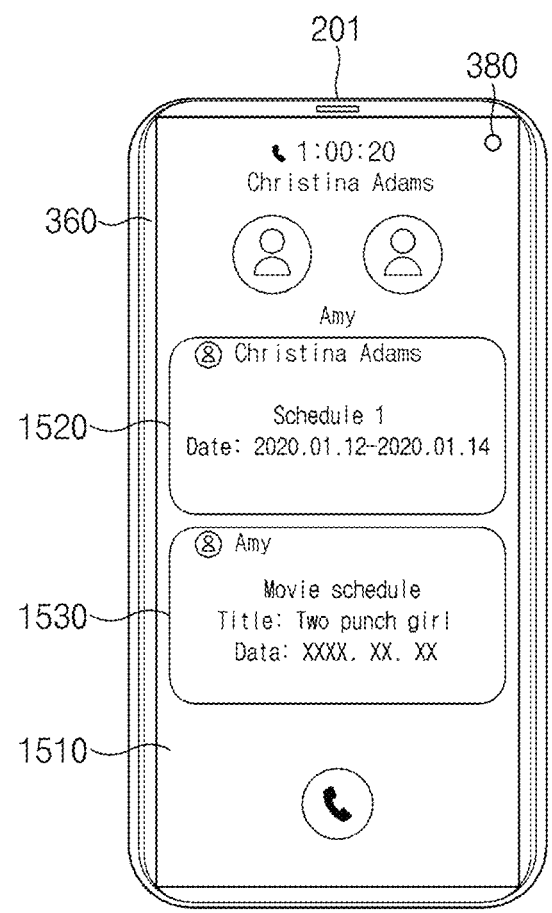
FIG. 15 illustrates a diagram of an example of a second user interface during a conference call according to an embodiment.

FIG. 15 illustrates a diagram of an example of a second user interface during a conference call according to an embodiment.

In the example of FIG. 15, the first application may be a call application for a conference call. For example, a first user interface 1510 may correspond to an execution screen of the call application. According to an embodiment, the electronic device 201 may select the second application based on voice recognition and user information. For example, the user A of the electronic device 201 may perform a conference call with the user B (e.g., Christina Adams) and the user C (e.g., Amy). For example, the users A, B, and C may discuss a movie reservation schedule through the conference call. The electronic device 201 may identify keywords "movie" and "schedule" based on voice recognition, and may determine the second application based on the keywords.

For example, for the user B, the calendar application may be determined as the second application. The electronic device 201 may provide a second user interface 1520 that provides schedule information obtained from the calendar application. For the user C, the movie reservation application may be determined as the second application. The electronic device 201 may provide a third user interface 1530 that provides movie schedule information obtained from the movie reservation application. As described above, the electronic device 201 may select a different application for each user. For example, even if the same keyword is used, information of the application database 440 applicable to each user may be different, as described above with respect to FIG. 4.

Figure 16:
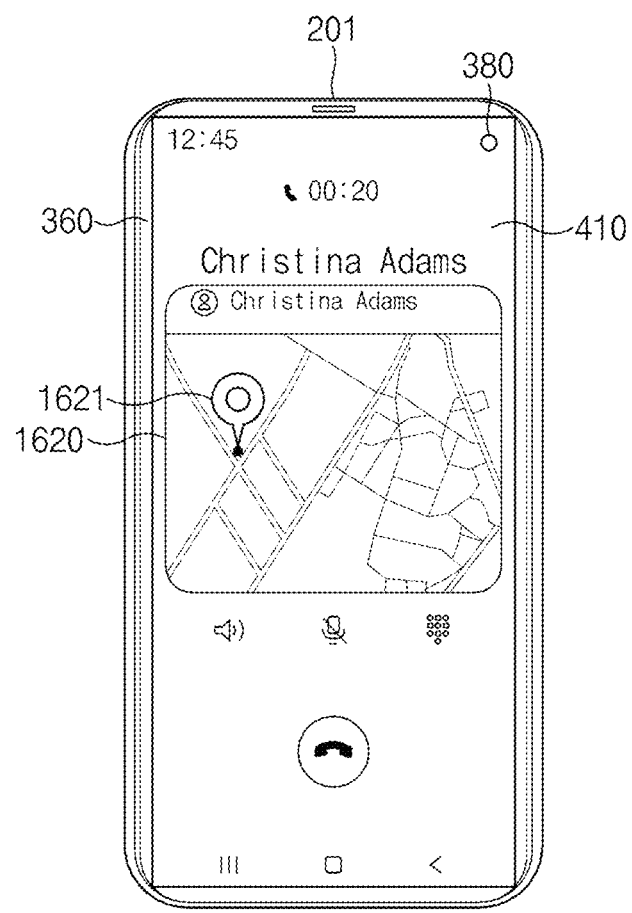
FIG. 16 illustrates a diagram of an example of a second user interface according to an embodiment.

FIG. 16 illustrates a diagram of an example of a second user interface according to an embodiment.

In the example of FIG. 16, a user of the electronic device 201 may perform a call with a user (e.g., a child) of the external electronic device 203. The electronic device 201 may provide the first user interface 410 (e.g., a call application user interface) for communication with the external electronic device 203.

When the first user interface 410 is provided, the electronic device 201 may determine the second application corresponding to the user of the external electronic device 203. For example, the second application may be a tracker application capable of providing location information of the external electronic device 203.

The electronic device 201 may have access permissions to the tracker of the user of the external electronic device 203. In this case, the electronic device 201 may provide the second user interface 1620 on the first user interface 410. For example, the second user interface 1620 may include an indicator 1621 indicating a location of a tracker device related to the external electronic device 203.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a display;
   a communication circuit;
   a memory; and
   a processor operatively connected to the display, the communication circuit, and the memory, wherein the processor is configured to:
      obtain a user input for initiating a call to a first external electronic device;
      display, using the display, a first user interface for the call by executing a call application based on the user input;
      determine a control application mapped to the first external electronic device, wherein the control application is for controlling a second external electronic device;
      obtain, during the call, permission information for accessing the second external electronic device, associated with an account of the first external electronic device;
      display, by executing the control application, a second user interface for accessing the second external electronic device on a partial region of the first user interface based on the permission information during the call;
      determine a plurality of second applications based on user identification information of the first external electronic device; and
      display a user interface for selecting the control application among the plurality of second applications,
   wherein the second user interface corresponds to a widget provided by the control application.

2. The electronic device of claim 1, wherein the processor is further configured to:
   obtain the permission information from the memory, or obtain the permission information from a server for storing account information of the electronic device and account information of the first external electronic device.

3. The electronic device of claim 1, wherein the processor is further configured to:
   transmit, to the first external electronic device, information requesting permission for access to the second external electronic device; and
   obtain information on access permission by receiving a response corresponding to the request.

4. The electronic device of claim 1, wherein the processor is further configured to:
   determine the control application based on user identification information of the first external electronic device.

5. The electronic device of claim 4, wherein the processor is further configured to:
   obtain information from the second external electronic device by using the control application; and
   display the obtained information on the second user interface.

6. The electronic device of claim 1, wherein the second external electronic device is an internet-of-things (IoT) device owned by a user of the first external electronic device.

7. A method for communication of an electronic device, the method comprising:
   obtaining a user input for initiating a call to a first external electronic device;
   displaying, using a display of the electronic device, a first user interface for the call by executing a call application based on the user input;
   determining a control application mapped to the first external electronic device, wherein the control application is for controlling a second external electronic device;
   obtaining, during the call, permission information for accessing the second external electronic device associated with an account of the first external electronic device;
   displaying, by executing the control application, a second user interface for accessing the second external electronic device on a partial region of the first user interface based on the permission information during the call;

determining a plurality of second applications based on user identification information of the first external electronic device; and displaying a user interface for selecting the control application among the plurality of second applications, wherein the second user interface corresponds to a widget provided by the control application.

8. The method of claim 7, wherein the obtaining of the permission information includes obtaining the permission information from a memory of the electronic device or a server, and the server stores account information of the electronic device and account information of the first external electronic device.

9. The method of claim 7, wherein the obtaining of the permission information includes:

transmitting, to the first external electronic device, information requesting permission for access to the second external electronic device; and receiving a response corresponding to the request.

10. The method of claim 7, further comprising:

determining the control application based on user identification information of the first external electronic device.

11. The method of claim 10, further comprising:

obtaining information from the second external electronic device by using the control application; and displaying the obtained information on the second user interface.

12. The method of claim 7, wherein the second external electronic device is an internet-of-things (IoT) device owned by a user of the first external electronic device.

* * * * *